United States Patent Office 3,808,097
Patented Apr. 30, 1974

3,808,097
PRODUCTION OF FLUORINE-18 LABELED
5-FLUOROURACIL
Joanna S. Fowler, Shoreham, Richard M. Lambrecht, East Quogue, and Alfred P. Wolf, Setauket, N.Y., assignors to the United States of America as represented by the United States Atomic Energy Commission
No Drawing. Filed Nov. 28, 1972, Ser. No. 310,180
Int. Cl. G21g 1/00
U.S. Cl. 176—11                                7 Claims

ABSTRACT OF THE DISCLOSURE

A method of producing radioactive fluorine-18 labeled 5-fluorouracil comprising the steps of bombarding gaseous neon containing stable fluorine with a beam of deuterons to produce fluorine-18, passing the resulting gas mixture through a solution of uracil in trifluoroacetic acid until all of the former has reacted with fluorine, and evaporating the reacted solution to produce a solid residue followed by subliming the residue to recover the labeled 5-fluorouracil as the sublimate.

BACKGROUND OF THE INVENTION

The invention described herein was made in the course of, or under a contract with the U.S. Atomic Energy Commission.

It is known that 5-fluorouracil will selectively localize in, and in some cases, decrease the growth rate of certain tumors. Consequently, there has been some interest in tagging this pharmaceutical with a radioactive isotope for the purpose of making it possible to conduct clinical investigations for the purpose of scanning to identify and locate these tumors. Some of these tumors may appear in places such as the stomach and intestine or in the breast where their identification and location are somewhat troublesome.

It has been suggested that 5-fluorouracil may be labeled with radioactive fluorine-18 which is intensely radioactive for a short period of time (e.g. half life of 110 minutes). However, methods which have been developed to produce this compound involve an expenditure of time which is excessive in the light of the short half life of this isotope. For example, one such method involves a time-consuming condensation reaction. This method is too slow to allow incorporation of the short-lived $^{18}$F in a sufficiently short period of time to be useful for diagnostic or therapeutic purposes.

SUMMARY OF THE PRESENT INVENTION

The present invention makes it possible to produce a high yield of 5-fluorouracil-$^{18}$F of high purity (i.e., >99%) at a sufficiently rapid rate of production that the radiopharmaceutical may be evaluated as a tumor localization or as an in vivo drug dose agent. A typical rate of production is found to be less than 40 minutes.

Briefly described, the invention involves slowly passing or purging a gas mixture containing $^{18}$FF through a solution of uracil in trifluoroacetic acid (TFA) at a temperature below 0° C. until all of the uracil has been reacted with the fluorine, evaporating the reacted solution with a stream of an inert gas to produce a solid residue, and subliming the residue to recover the labeled 5-fluorouracil as the sublimate. The 5-fluorouracil-$^{18}$F may be further purified by anion exchange as an aqueous solution to remove impurities if present.

This process produces and it is thus a principal object of this invention to produce a high yield and purity 5-fluorouracil-$^{18}$F sufficiently rapidly to permit its effective use as a radiopharmaceutical.

Other objects and advantages of this invention will hereinafter become obvious from the following description of a preferred embodiment of this invention.

DESCRIPTION OF THE PREFERRED EMBODIMENT

In accordance with a preferred embodiment of this invention, a mixture of high purity anhydrous neon gas containing 5–8 molar percent fluorine is irradiated in a vessel constructed of high purity nickel whose inner surface is coated with anhydrous nickel fluoride with a beam of deuterons having an initial kinetic energy not in excess of 15 mev. to generate $^{18}$F, bubbling said neon gas containing $^{18}$FF through a solution of uracil in trifluoroacetic acid at a temperature above the freezing point of the acid but not in excess of 0° C. until all of the uracil has been reacted with fluorine, evaporating the reacted solution with a stream of inert gas at ambient pressure and temperature conditions until a residue is produced, subliming the residue under a vacuum in the range of 1 to 10 torr at a temperature in the range of 210 to 215° C. to prodce a sublimate consisting substantially of all 5-fluorouracil-$^{18}$F, and removing any radioactive impurities if present from the sublimate by anion exchange.

The $^{18}$FF may be bubbled through the uracil solution at a rapid rate, typically 5 to 7 ml./min. at STP.

In the irradiation of the neon to produce $^{18}$F, by high purity neon is meant anhydrous neon of 99.99+% purity. Deuteron energy in excess of 15 mev. appears at an insignificant cross section for the production of $^{18}$F so that 15 mev. is the preferable upper limit. For maximum yield of $^{18}$F, per microampere hour of irradiation dose, the deuteron beam should be degraded by the neon to ~0 mev., and the maximum beam intensity available should be used in order to obtain a radiopharmaceutical of high specific activity.

The fluorine content of the neon during irradiation and during the bubbling is critcial. Synthesis will not go to completion if the $^{18}$FF is present at less than about 5 molar percent while if in excess of about 18%, overfluorination will result.

Reaction of the $^{18}$FF with the uracil solution should preferably be ended at the instant if possible when all the uracil has been reacted. Permitting the $^{18}$FF to continue to pass through the solution results in radioactive impurities which must later be removed.

For evaporation, any gas inert in the existing conditions such as nitrogen may be passed over the reacted solution. As they art not critical, any suitable pressure and temperature such as ambient may be employed.

Sublimation must be conducted under vacuum, however, preferably between about one and ten torr at a temperature within the range of about 210–215° C. This temperature range, from tests which have been run, appears to be critical to the process.

Purification of the sublimate is required only when radioactive impurities are found, due to some overfluorination. This may be accomplished by passing a water solution of the sublimate through a suitable anion exchange resin which passes only the pure 5-fluorouracil-$^{18}$F, retaining the radioactive impurities. More than one purification step may be conducted if desired or necessary. The final radiopharmaceutical is found to have a purity of >99% purity. One such anionic exchange resin consists of a cross-linked copolymer of styrene with divinyl benzene containing quaternary ammonium groups as the functional groups. The total time required for a complete synthesis and purification in accordance with the principle of this invention from the time the $^{18}$FF is prepared is less than 40 minutes.

The following example illustrates this invention:

A target, consisting of neon (Matheson Research Grade) containing 7.6% (0.29 mmole) of fluorine scavenger was irradiated with deuterons at the Brookhaven National Laboratory 60" cyclotron. The $^{18}$F-fluorine was produced from the $^{20}$Ne(d,α)$^{18}$F nuclear reaction. The beam was degraded from 9.7 to 7.8 mev. in the target. Approximately 80–90% of the $F_2$-$^{18}$F produced was slowly purged from the target chamber (total time: 15 min.) into the solution of 1.73 mg. (0.0133 mmoles) of uracil in 0.3 ml. of TFA at −10° C. The consumption of uracil was monitored by thin layer chromatography (TLC). After all of the uracil and reacted, the solution was transferred to a sublimation tube using a minimum amount of TFA to wash the reaction vessel. This was blown to dryness with a stream of nitrogen and the residue sublimed at 210°–215° (1 mm.) to give 1.80 mg. (90%) of crude 5-fluorouracil-$^{18}$F, M.P. 270–275° (dec.) (lit M.P. 282–283°). The infrared and ultraviolet spectra were identical with authentic samples of 5-fluorouracil. The mass spectrum (Hitachi RMU7) showed m/e=130. Radiochemical purity was determined by TLC employing Eastman Chromagram Sheet (silica gel) with ethyl acetate:acetone:water (70/40/5) as developing solvent. The TLC's showed 1–5% of the total activity on the plate to be an impurity concentrated at the plate origin and the remainder in the 5-fluorouracil band. The impurity was removed by filtering a water solution (1 ml.) of the sublimed material through a 0.5 x 3.5 cm. column of Dowex 1-X-8 anion exchange resin (50–100 mesh; chloride form) followed by elution with 5-ml. of water. This gave a 67% chemical yield of 5-fluorouracil-$^{18}$F in >99% purity.

What is claimed is:
1. The method of producing 5-fluorouracil-$^{18}$F comprising the steps of:
    (a) irradiating a target consisting of an anhydrous mixture of neon gas and 5–8 molar percent stable fluorine with a beam of deuterons having a kinetic energy up to 15 mev. to generate $^{18}$FF;
    (b) purging said $^{18}$FF mixed with said neon from said target through a solution of uracil in trifluoroacetic acid;
    (c) evaporating the reacted solution to produce a residue; and
    (d) subliming said residue under a vacuum at a temperature at about 210–215° C. to recover 5-fluorouracil-$^{18}$ as the sublimate.
2. The method of claim 1 in which the beam of deuterons is degraded to 0 mev. in the neon target.
3. The method of claim 1 in which the reaction of said $^{18}$FF with the uracil solution is terminated not later than when all of the uracil has been consumed.
4. The method of claim 3 in which the reaction of said $^{18}$FF with the uracil solution is conducted at a temperature above the melting point of the trifluoroacetic acid up to about 0° C.
5. The method of claim 1 in which the $^{18}$FF is bubbled into the uracil solution at a rate of 5–7 ml./min. of gas at STP.
6. The method of claim 1 in which evaporation of the solution is conducted with a gas inert to the reactants present under ambient pressure and temperature conditions.
7. The method of claim 4 in which sublimation is conducted at a vacuum in the range of about one to ten torr.

References Cited

Physical Review, vol. 136, No. 2B, October 1964, pp. B399–B404.

HARVEY F. BEHREND, Primary Examiner

U.S. Cl. X.R.

176—14